Patented Aug. 30, 1932

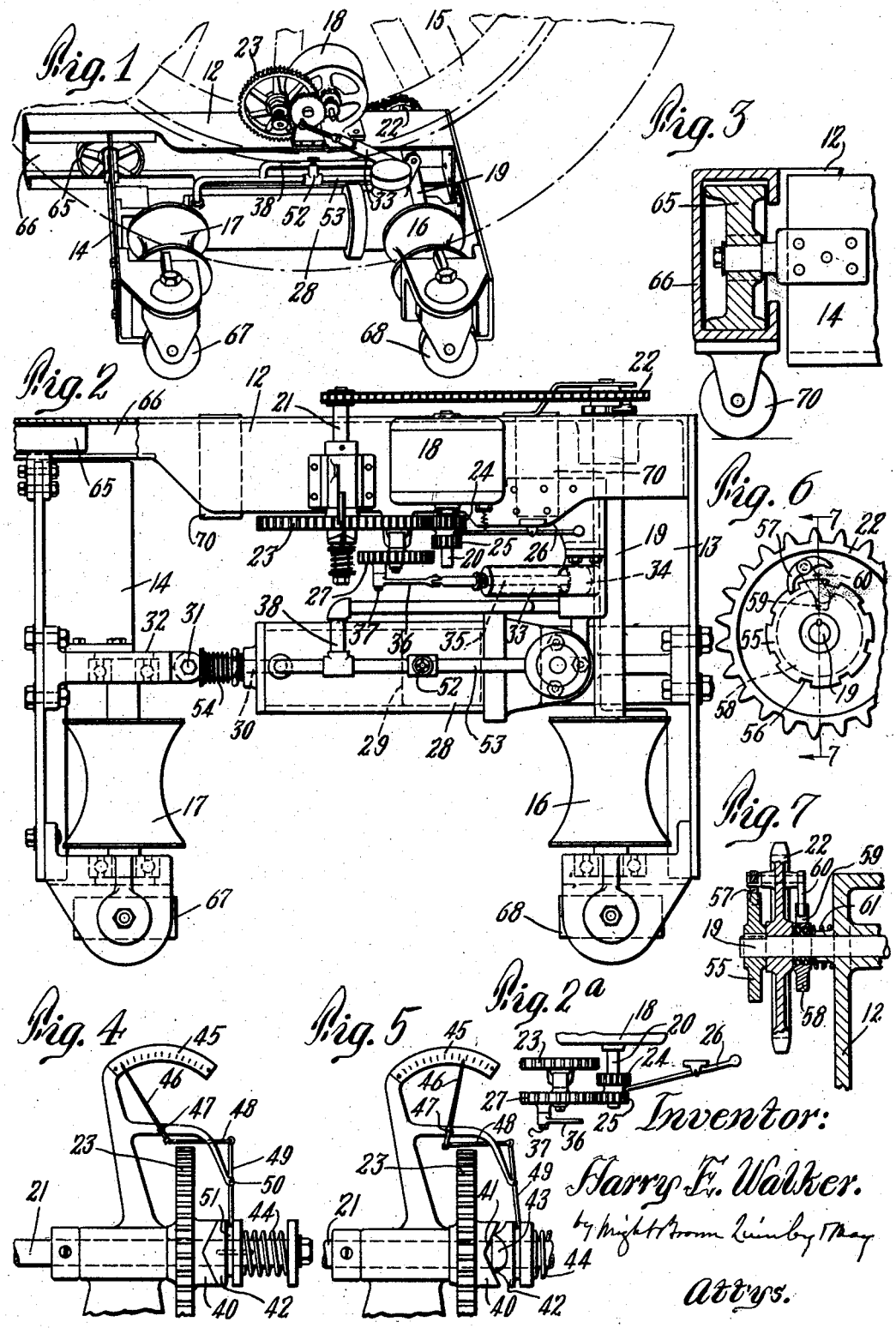

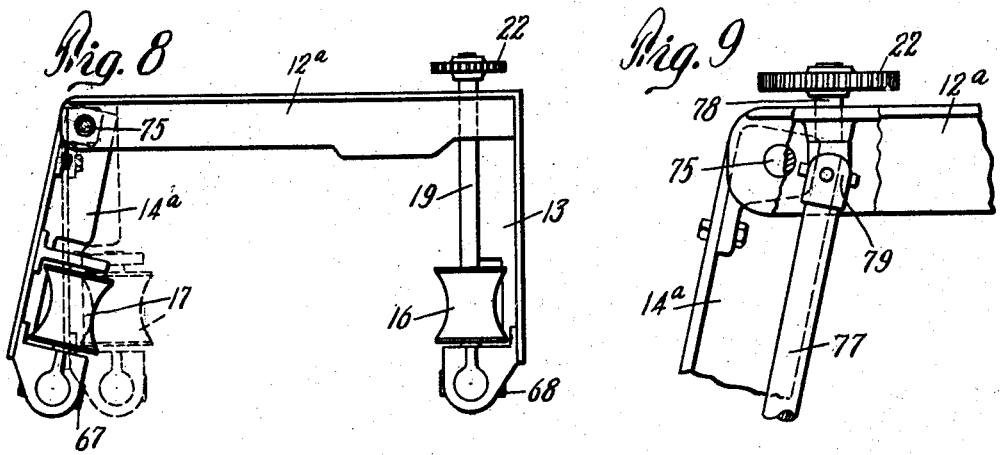
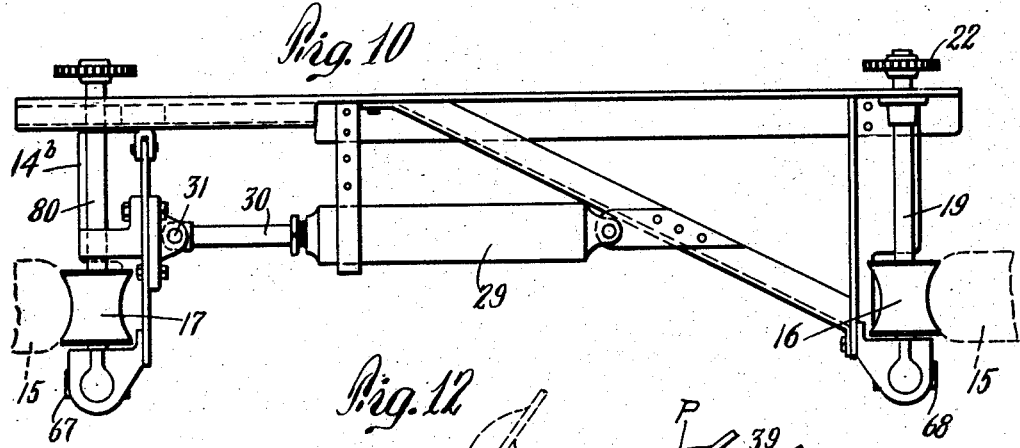
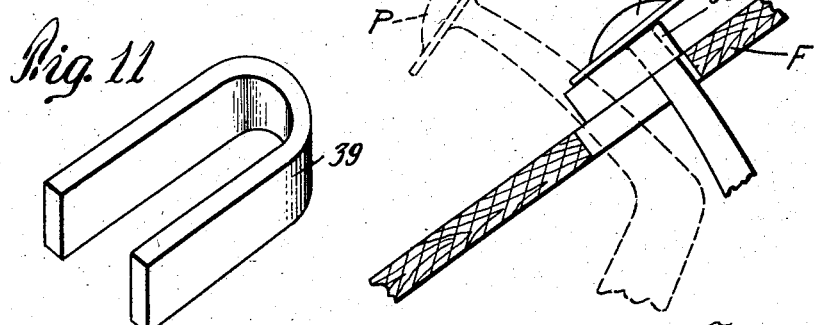

1,874,838

UNITED STATES PATENT OFFICE

HARRY E. WALKER, OF FAIRFIELD, MAINE

PORTABLE BRAKE-TESTING MACHINE

Application filed September 26, 1929. Serial No. 395,263.

This invention relates to means for testing and facilitating the adjustment of automobile brakes, and its object is to provide a portable machine which may be conveniently applied to a wheel at either side of an automobile standing on a floor or other wheel base, operated to raise the wheel from the base, and then operated to rotate the wheel while its brake is applied by the usual brake pedal and indicate the resistance offered by the brake to the rotation of the wheel, each operation being caused by a motor constituting an element of the machine, without the employment of means independent of the wheel-rotating and resistance-indicating means for raising the wheel, and without considerable muscular effort by the operator.

Of the accompanying drawings forming a part of this specification,—

Figure 1 is a perspective view showing the machine operatively conditioned and supporting a wheel, a portion of which is shown by dotted lines.

Figure 2 is a top plan view showing the machine on a larger scale.

Figure 2a is a fragmentary view showing parts shown by Figure 2.

Figure 3 is a fragmentary view, showing in section the hereinafter described runway, the traction wheel therein, and the caster wheel supporting the runway.

Figures 4 and 5 are fragmentary side views showing and illustrating the operation of the meter hereinafter described.

Figure 6 is a side view showing the means hereinafter described for permitting free rotation of the vehicle wheel after the wheel-lifting operation.

Figure 7 is a section on line 7—7 of Figure 6.

Figures 8 and 9 are plan views illustrating modifications.

Figure 10 is a plan view illustrating another modification.

Figure 11 is a perspective view of a stop member employed in limiting the downward movement of a brake pedal when said pedal is depressed before the testing operation.

Figure 12 shows a portion of the brake pedal and a portion of the floor through which it moves, the stop member being shown in its operative position.

The same reference characters indicate the same parts in all the figures.

Figures 1–7 inclusive, show the preferred construction of my improved machine, which comprises a recessed portable frame including a body member 12, an arm member 13 fixed thereto, and an arm member 14 which is movable relative to the body and fixed arm members. The frame is approximately U-shaped and is extensible and contractible by movements of the arm member 14 toward and from the arm member 13.

The arm members are adapted to be located on a wheel base such as a floor, one arm member being before, and the other behind a vehicle wheel 15 resting on the base when the frame is extended.

The fixed frame member 13 is provided with a wheel-engaging roller 16, and the movable frame member 14 is provided with a similar wheel-engaging roller 17, said rollers being preferably grooved to conform to the tire of the wheel. The rollers are operable by the contraction of the frame to raise the wheel from the base.

Operating mechanism is provided including a motor 18 mounted on the body member of the frame, frame-contracting means operable by the motor to raise from the base a wheel engaged by said rollers, and driving means operable by the motor to drive the roller 16 and a wheel supported by the two rollers. The roller 17 is idle and rotates in bearings on the movable arm member 14. The roller 16 is fixed to a driving shaft 19 connected by torque-transmitting connections with the shaft 20 of the motor. Said connections include a transmission shaft 21 journalled in a bearing on the frame body member 12, a sprocket chain engaged with a sprocket wheel 22 (Figure 6) fixed to the shaft 19 and with another sprocket wheel fixed to the transmission shaft 21, a transmission gear 23 mounted on the transmission shaft, and a gear 24 on the motor shaft.

The gear 24 is the inner member of the pair of shiftable connected gears, the outer member of which is designated by 25. Said shiftable gears are movable on the motor shaft and are engaged with the latter to rotate therewith. When the gear 24 is engaged with the transmission gear 23, as shown by Figure 2, the motor transmits torque to the driven roller 16.

The shiftable gears 24 and 25 are movable on the motor shaft by a manually operable shifting lever 26 to separate the gear 24 from the transmission gear 23 and engage the shiftable gear 25 with a pump gear 27 constituting an element next described of means for contracting the frame.

Included in said contracting means is a hydraulic ram comprising a cylinder 28 fixed to the frame arm member 13 and a piston 29 movable in the cylinder, and having a rod 30 which is pivoted at 31 to an ear 32 fixed to the movable frame arm 14.

33 designates the cylinder of a plunger pump fixed to the frame arm 13. The plunger 34 of said pump has a rod 35 connected by a pitman 36 with an eccentric wrist pin 37 on the pump gear 27. A pipe line 38 connects the pump with one end of the ram cylinder 28 (the left hand end in Figure 2).

When the shiftable gears 24 and 25 are moved to the position shown by Figure 2a, the transmission gear 23 is disconnected from the motor so that the driving means, above described, is inoperative, the motor shaft being connected by the gear 25 with the pump gear 27 so that the lifting means becomes operative. Any suitable liquid, such as oil, is now forced by the pump into the ram cylinder 28, and caused to force the piston 29 to the right as viewed in Figure 2, so that the movable arm is pulled inwardly until the frame is sufficiently contracted to raise a vehicle wheel engaged with the rollers 16 and 17, the roller 16 now rotating loosely. The liquid pressure maintains the frame contracted and the wheel raised during the subsequent operation of driving the wheel to test its brake, this operation occurring when the shiftable gear 24 is engaged with the transmission gear and the shiftable gear 25 is separated from the pump gear, as shown by Figure 1.

Before the testing operation, the brake pedal P (Figure 12) of an automobile whose brakes are being tested, is depressed to apply the brake of the raised wheel to its drum. The depression of the pedal may be determined by a U-shaped stop member 39 interposed between the pedal head and the floor F. Said stop member constitutes an accessory of the testing machine and may be one of a plurality of interchangeable members, each differing in width from the others. The resistance to the rotation of the wheel by the driving means is imparted to the transmission shaft 21 and is indicated by the meter, next described, associated with the transmission shaft, said meter being shown by Figures 4 and 5.

The transmission gear 23 is loose on the transmission shaft and is provided with a hub 40 having a cam face 41. Slidable on the transmission shaft and rotatable therewith by a spline, is a sleeve 42 having a cam face 43 which is pressed by a spring 44 against the cam face 41. Said faces are complemental to each other and are normally interengaged as shown by Figure 4. The meter includes a fixed graduated scale 45 and a pointer 46 movable over said scale by connections between the pointer and the sleeve 42. The pointer is pivoted at 47 to a branch of a fixed arm supporting the scale 45 and is connected by a link 48 with a rocker rod 49 pivoted at 50 to the branch of the scale-supporting arm. One end of the rod 49 enters a peripheral groove 51 in the sleeve 42.

When resistance to the rotation of the shaft 21 becomes sufficient to overcome the stress of the spring 44, the sleeve 42 is moved by the coaction of the cam faces outwardly from the collar 40 as indicated by Figure 5, and the collar is caused to actuate the pointer 46 and indicate the degree of resistance.

After the brake has been tested, liquid pressure in the ram cylinder 28 is equalized on both sides of the piston 29 by manually opening a by-pass valve 52 in a by-pass 53 communicating with the pipe line 38 and the right hand end of the cylinder (as viewed in Figure 2), so that movable frame member 14 is free to be moved to extend the frame, by a spring 54 and by downward pressure exerted by the vehicle wheel on the rollers 16 and 17, so that the wheel descends upon the base. The spring 54 is mounted on the piston rod 30 and is compressed between the ram cylinder and the ear 32 of the movable arm by the contraction of the frame.

The movable frame arm 14 is preferably provided at its inner end with a traction wheel 65 movable in a runway 66 constituting an extension of the body member 12 of the frame. The outer end of the arm is provided with a truck or caster wheel 67 movable on the wheel base and preferably swiveled to the arm. The outer end of the fixed frame arm 13 is provided with a similar truck or caster wheel 68. Portability of the machine is provided by the trucks 67 and 68, and by additional trucks 70 mounted on the under side of the body member 12 of the frame, these trucks being preferably journalled in bearings fixed to the body member, instead of being swiveled thereto. When the brake of a wheel at one side of the vehicle has been tested in the manner described, the machine may be moved to the opposite side to similarly test the brake of the other wheel. The motor is reversible so that its shaft may be rotated clockwise when the machine is at one side of the vehicle, and counterclockwise when the machine is at the opposite side. Any suitable reversible electric motor, adapted to be reversed by a switch, may be employed, the construction of such motor being well known and requiring no description.

In the modification shown by Figures 8 and 9, the movable arm, here designated by 14a, is connected at its inner end with the body member designated by 12a by a vertical pivot stud 75, so that the frame is extended by a swinging movement of the movable arm. The roller 17 on the movable arm may be driven, like roller 16, through a suitable connection with the motor. Figure 9 shows the movable arm provided with a shaft 77 whereby its roller 17 may be rotated, said shaft being connected with a shaft 78 by a universal joint designated by 79. The shaft 78 constitutes an element of the means connecting the shaft 77 with the motor.

The modification shown by Figure 10 adapts the machine to test the brakes of a four-wheel brake automobile, the front and rear wheel brakes at one side of the vehicle being tested simultaneously. The roller 16 is supported and driven as already described, and the roller 17 is fixed to a shaft 80 journalled on the movable arm, here designated by 14b, the shaft 80 being driven by the motor. In this case, the roller 16 may be located against the front side of one wheel 15, and the roller 17 against the rear side of the other wheel, while the frame is extended, the frame being then contracted to cause the rollers to lift the wheels simultaneously, the wheels at the opposite side of the vehicle being blocked to prevent endwise movement of the vehicle.

In the broadest aspect of the invention, the machine comprises a portable carrier embodied, in this instance, in the above-described truck-supporting frame, testing mechanism on the carrier for raising a brake-equipped wheel from a wheel base and driving the wheel when it is raised, and means operable by said mechanism for indicating resistance to the rotation of the wheel caused by the application of the wheel brake.

An essential element of the testing mechanism is a driven roller adapted to frictionally engage a wheel tire and drive the wheel when the latter is raised from a base, said roller being, in the preferred embodiment of the invention, the roller 16. Any suitable means may be provided to raise a wheel to be tested so that it may be engaged and driven by said roller.

I provide means for temporarily releasing the connection between the driving shaft 19 and the sprocket wheel 22 to temporarily permit free rotation in either direction of said driving shaft, and its roll 16, in case the brake bands of the vehicle wheel bearing on said roll have been excessively tightened, said means being shown by Figures 6 and 7, and in part by Figure 2 and next described. The sprocket wheel 22 is normally loose on the shaft 19. Fixed to said shaft at one side of the sprocket wheel 22 is a disk 55 having notches 56 in its periphery, the notches being formed so that said periphery constitutes a two-way ratchet adapted to be turned in either direction by a double pawl 57. A disk 58 mounted on the shaft 19 at the opposite side of the sprocket 22 has a slot 59 extending from its periphery toward its center and receiving an arm 60 fixed to the pivot stud which carries the pawl 57. The disk 58 is mounted on ball bearings, the inner raceway being fastened to the shaft, the outer raceway formed in the disk 58. A spring 61, mounted on the shaft, is compressed between the side of frame 12, and the hub of the disk 58. This compressing spring, by its frictional engagement, is sufficient to prevent the disk 58 from rotating when the pawl 57 is out of engagement with the slots 56. When the sprocket 22 is rotated to make a brake test, the disk 58 will tend to remain motionless, thus causing the arm 60 to rock. This rocking motion being conveyed to the pawl 57, will drop it into locking engagement with the disk 55, thus driving the shaft 19 on which the roller 16 is mounted. This device as described will operate equally well, whether the motor 18 is rotated clockwise or anti-clockwise. It is necessary that the wheel being tested be so mounted as to rotate loosely when desired, this being necessary for the purpose of detecting an excessively tightened brake band. To accomplish this free movement of the wheel being tested, the electric motor 18 is shut off, and the wheel turned slightly. Referring to Figure 6, it will be seen that a slight rotation of the wheel being tested to the right will cause the shaft 19 and the disk 55 to move to the left. This movement will throw the pawl out of engagement with the slots 56. The wheel may then be rotated freely in either direction, and will not lock again until power is applied to the sprocket 22.

I claim:—

1. A brake-testing machine comprising a recessed portable frame including a body member, an arm member fixed thereto, and a movable arm member, the frame being extensible and contractible and the arm members adapted to be located on a wheel base, the one before and the other behind a vehicle wheel thereon, when the frame is extended, wheel-engaging rollers on said arm members operable by the contraction of the frame to raise the vehicle wheel from the base; operating mechanism including a motor mounted on the frame, frame-contracting means operable by the motor to raise from the base a vehicle wheel engaged by said rollers, and driving means operable by the motor to drive one of said rollers and a wheel supported by the rollers, said mechanism including manually operable shifting means whereby the motor may be caused to successively operate the contracting means and the lifting means, and a meter operable by the driving means to indicate the resistance to the rotation of said wheel caused by its brake.

2. A brake-testing machine as specified by claim 1, the motor being reversible and adapted to impart a forward rotation to either a right or a left wheel on a driving axle.

3. A brake-testing machine as specified by claim 1, the frame-contracting means being embodied in a hydraulic ram including a cylinder mounted on the fixed frame arm, a connection between the piston of said ram and the movable frame arm, and a pump communicating with the cylinder and connected with the motor through said shifting means, the pump being operable to force liquid into the cylinder and cause the contraction of the frame.

4. A brake-testing machine as specified by claim 1, the frame-contracting means being embodied in a hydraulic ram including a cylinder mounted on the fixed frame arm, a connection between the piston of said ram and the movable frame arm, and a pump communicating with the cylinder and connected with the motor through said shifting means, the pump being operable to force liquid into the cylinder and cause the contraction of the frame, the cylinder being provided with a valve-controlled by-pass whereby pressure may be equalized on both sides of the piston to permit the extension of the frame.

5. A brake-testing machine as specified by claim 1, the driving means being embodied in a driving shaft fixed to the driven roller, and torque-transmitting connections between said shaft and the motor, said shifting means being included in said connections so that torque transmission is prevented during the operation of the frame-contracting means.

6. A brake-testing machine as specified by claim 1, the said operating mechanism including a driving shaft fixed to the driven roller, a transmission shaft on the frame body member, torque-transmitting connections between the driving and transmission shafts, means for rendering said connections alternately operative and inoperative, a transmission gear on the transmission shaft, a pair of shiftable gears including an inner and an outer gear slidable together on and rotated by the motor shaft, a manually operable shifting device engaged with the shiftable gears, a piston pump and a pump gear on the frame body member having an eccentric wrist pin connected with the pump plunger to operate the pump, the shiftable gears being movable in one direction to engage the outer gear with the pump gear and separate the inner gear from the transmission gear, to operate only the frame-contracting means, and in the opposite direction to engage the inner gear with the transmission gear and separate the outer gear from the pump gear, to operate only the driving means.

7. A brake-testing machine as specified by claim 1, the frame body member being provided with a runway, the movable member being provided at its inner end with a traction wheel movable in the runway and at its outer end with a truck movable on the wheel base, an element of the frame-contracting means being an ear fixed to the midlength portion of the movable arm member and coupled to another element of said means carried by the fixed arm member.

In testimony whereof I have affixed my signature.

HARRY E. WALKER.